United States Patent [19]

Reed

[11] 4,196,506

[45] Apr. 8, 1980

[54] TOOL CHANGER MACHINING CENTER

[75] Inventor: Robert E. Reed, Kaukauna, Wis.

[73] Assignee: Giddings & Lewis, Inc., Fond du Lac, Wis.

[21] Appl. No.: 856,523

[22] Filed: Dec. 1, 1977

Related U.S. Application Data

[63] Continuation-in-part of Ser. No. 721,115, Sep. 7, 1976, abandoned.

[51] Int. Cl.² .................................................. B23Q 3/157
[52] U.S. Cl. ..................................... 29/568; 414/730; 414/744
[58] Field of Search ............ 29/568; 214/1 BB, 1 BC, 214/1 BD; 414/729, 730, 744

[56] References Cited

U.S. PATENT DOCUMENTS

| | | | |
|---|---|---|---|
| 3,286,344 | 11/1966 | Brainard et al. | 29/568 |
| 3,516,149 | 6/1970 | Mickas | 29/568 |
| 3,691,655 | 9/1972 | Kurimoto et al. | 29/568 |
| 3,893,227 | 7/1975 | Suzuki et al. | 29/568 |

FOREIGN PATENT DOCUMENTS

| | | | |
|---|---|---|---|
| 2264080 | 7/1974 | Fed. Rep. of Germany | 29/568 |
| 2303637 | 12/1976 | France | 29/568 |

Primary Examiner—Z. R. Bilinsky
Attorney, Agent, or Firm—Leydig, Voit, Osann, Mayer & Holt, Ltd.

[57] ABSTRACT

An improved machining center including an automatic tool changer adapted for boring, drilling, milling, tapping and tool changing operations under numerical control. The machine, which may be built in both horizontal spindle and vertical spindle configurations, includes a tool storage matrix and tool transport shuttle compactly arranged on the upstanding column and a two-handed transfer arm on the headstock. The toolholders are carried in tool cups having mechanical latches. The matrix and the shuttle are also provided with mechanical latches for the tool cups actuated as an incident to transfer of tools between the matrix, shuttle, and arm or vice versa. The machine is adapted to operate with toolholders interchangable with those for a current commercial vertical spindle machining center.

19 Claims, 26 Drawing Figures

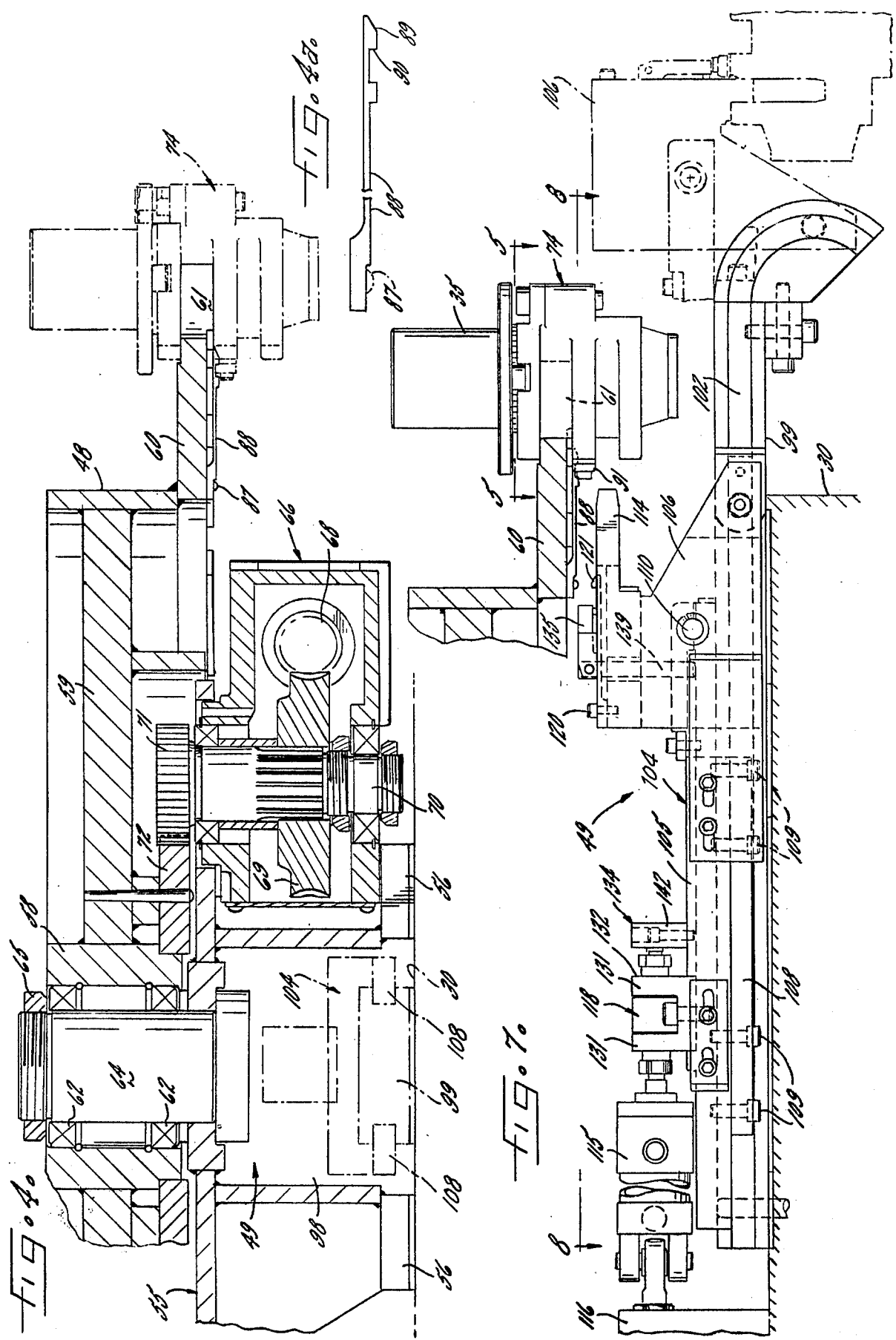

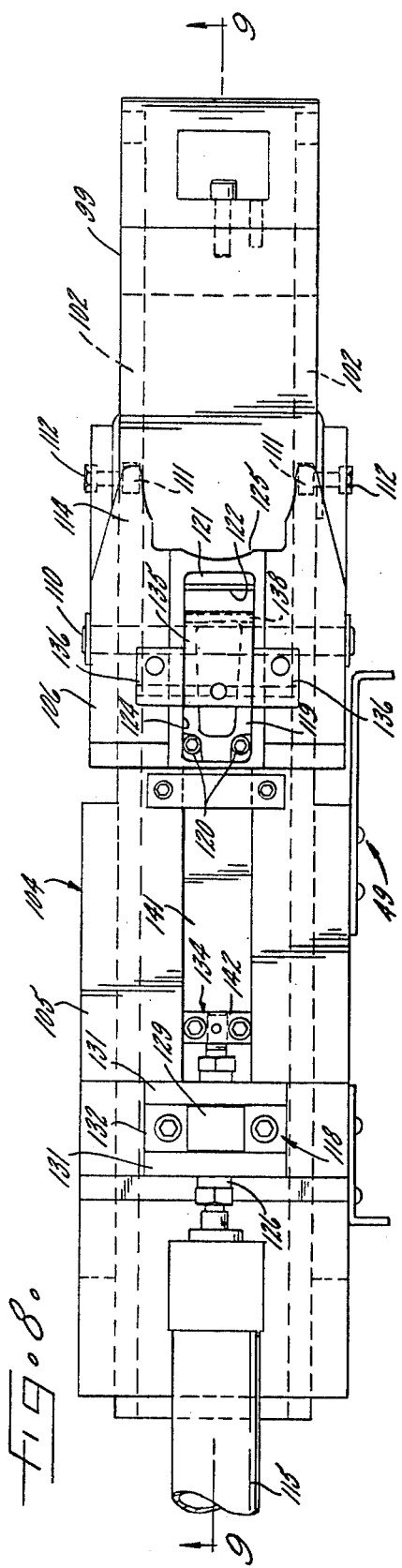
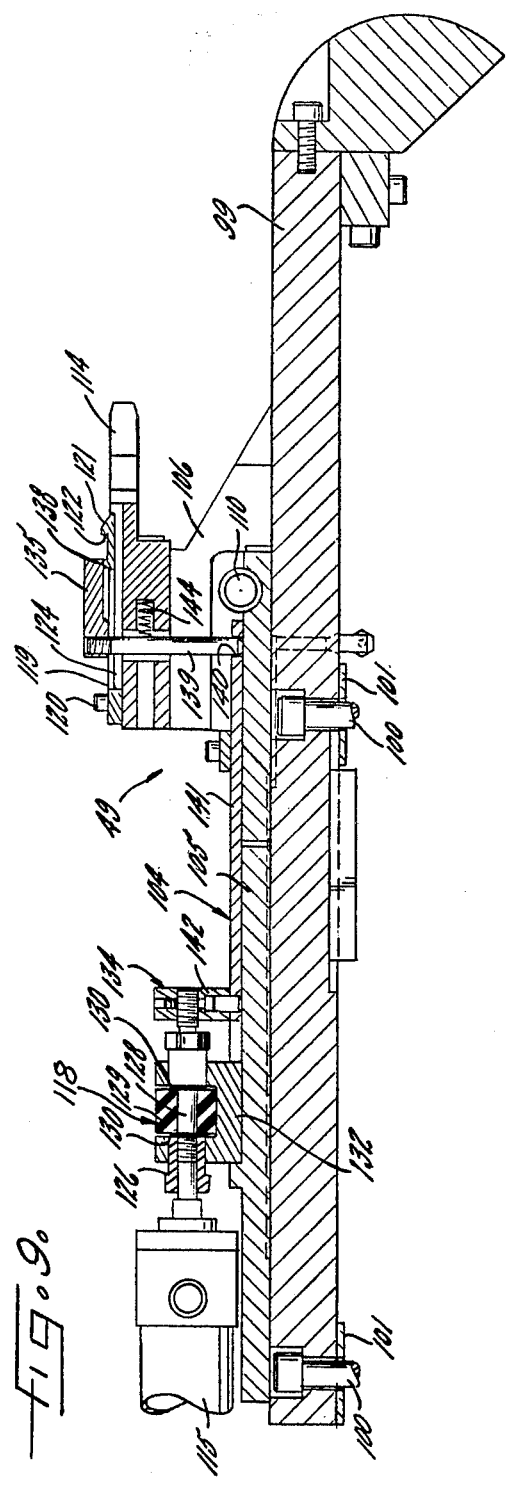

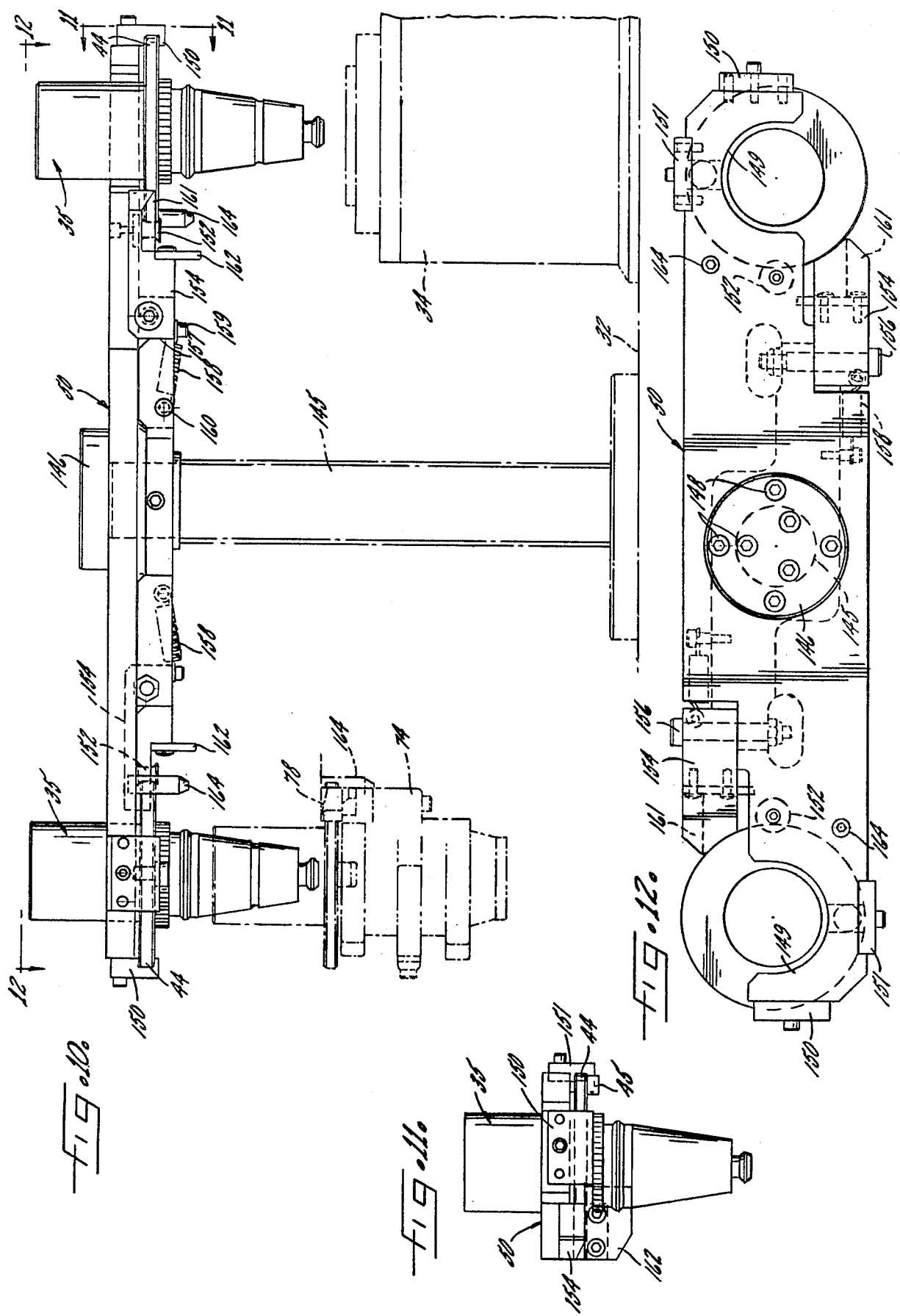

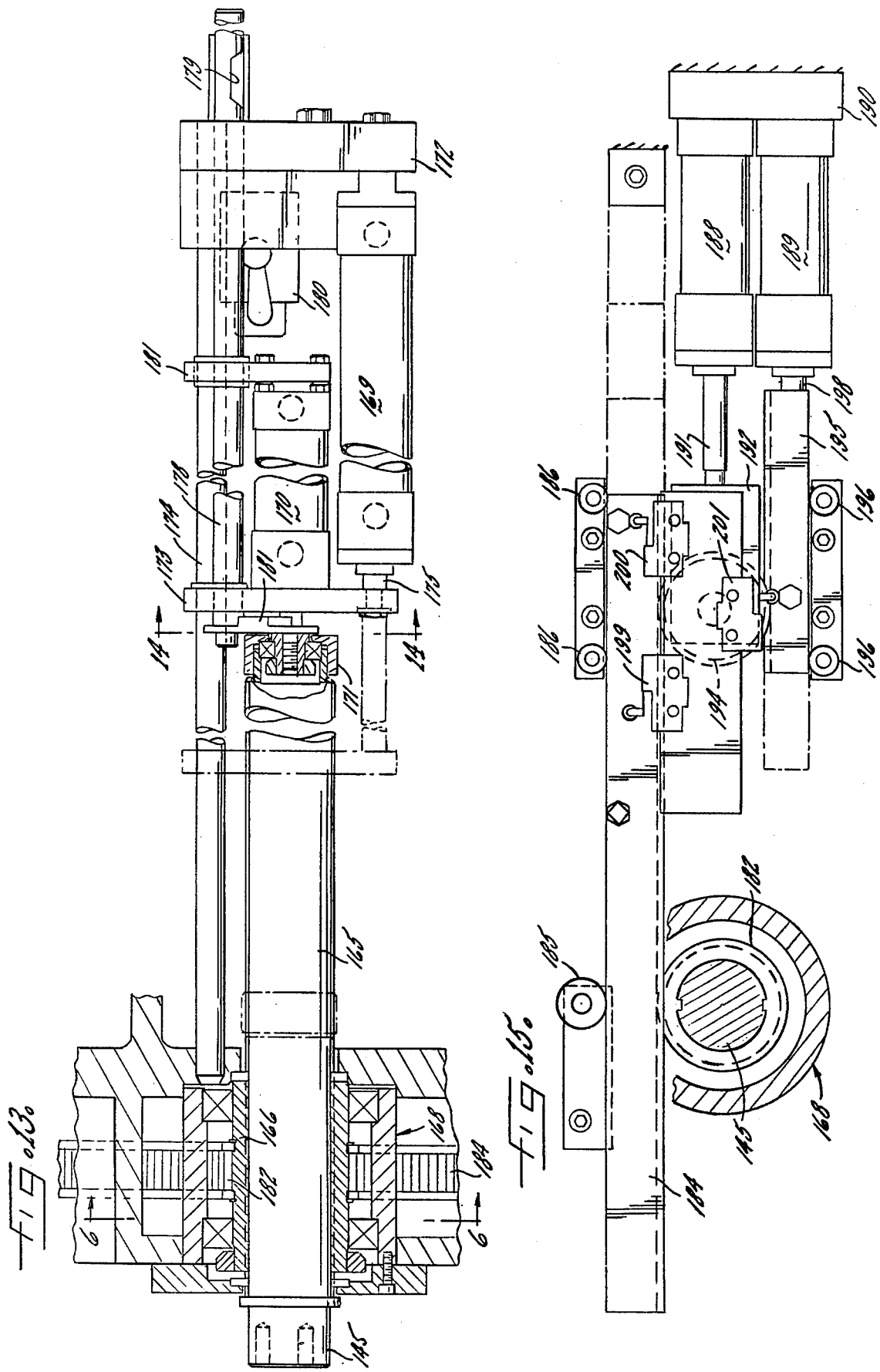

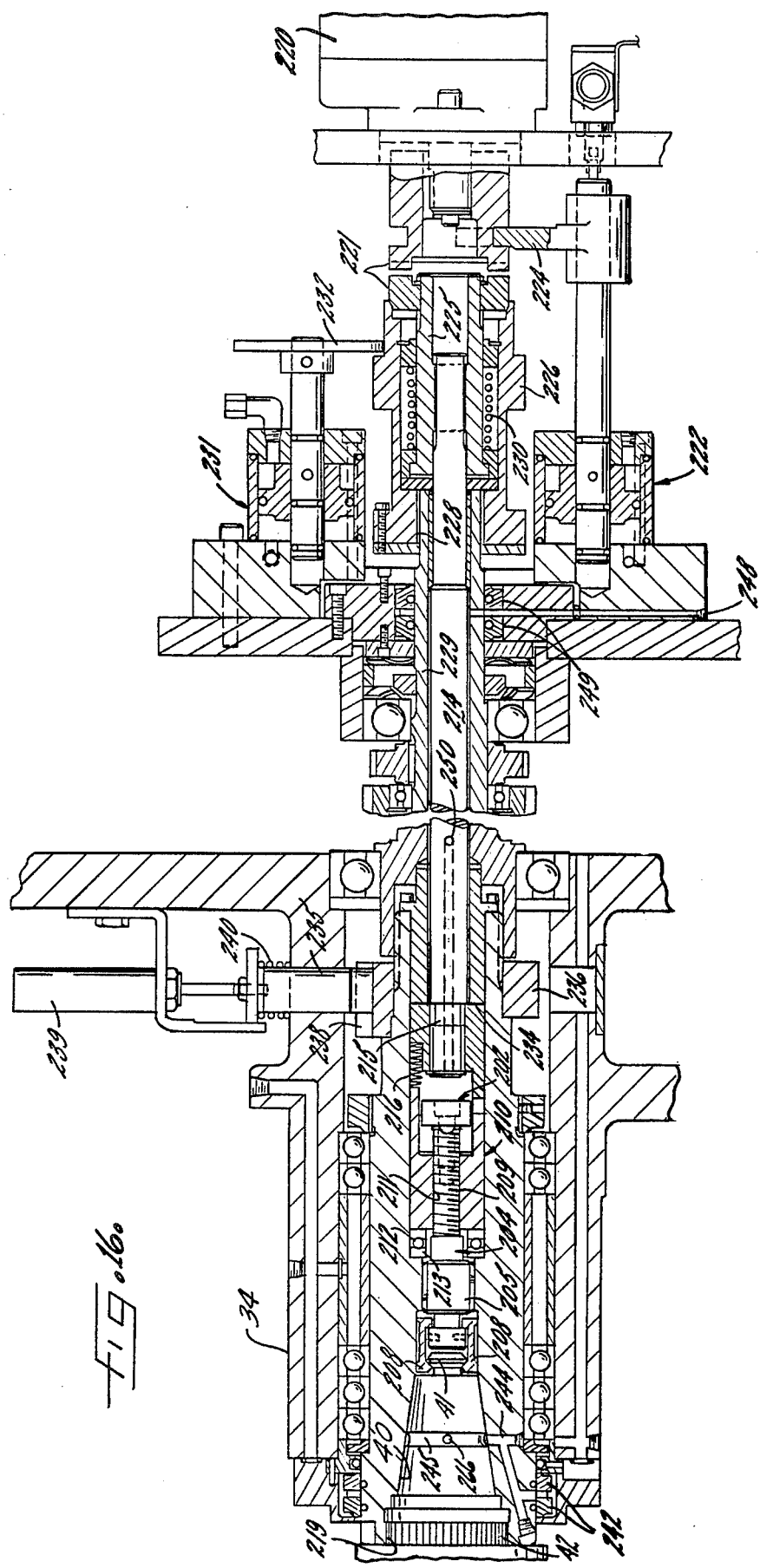

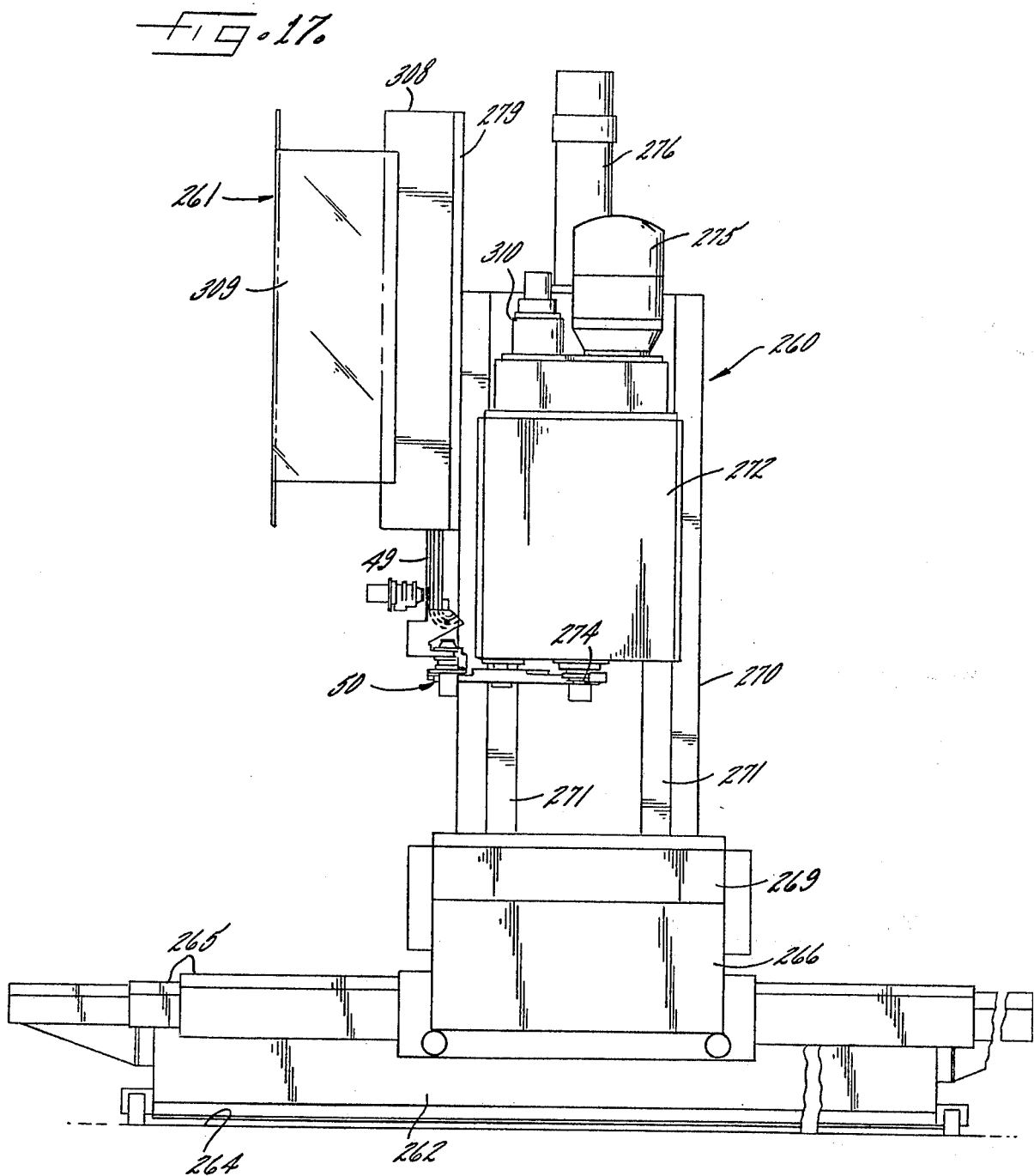

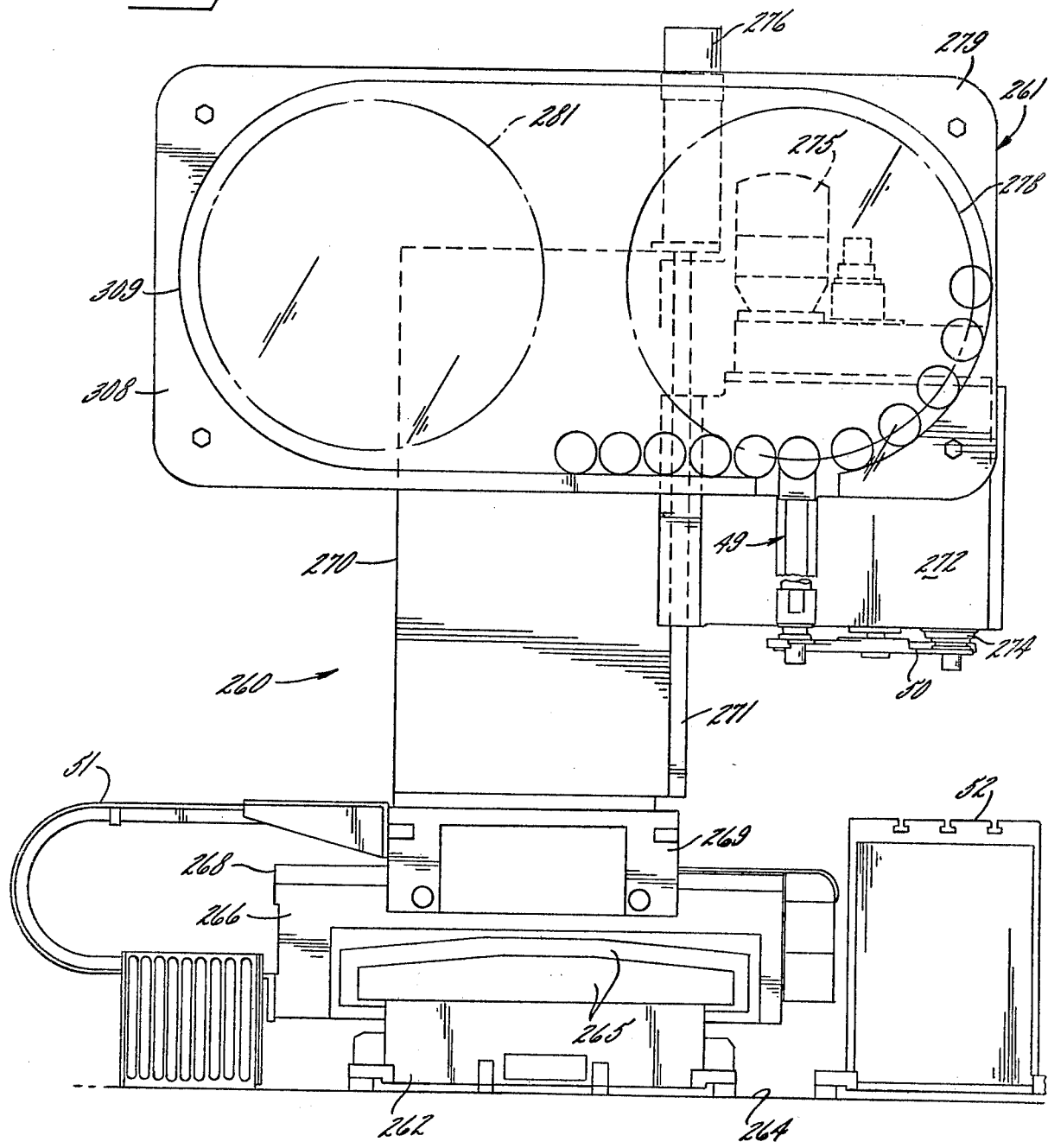

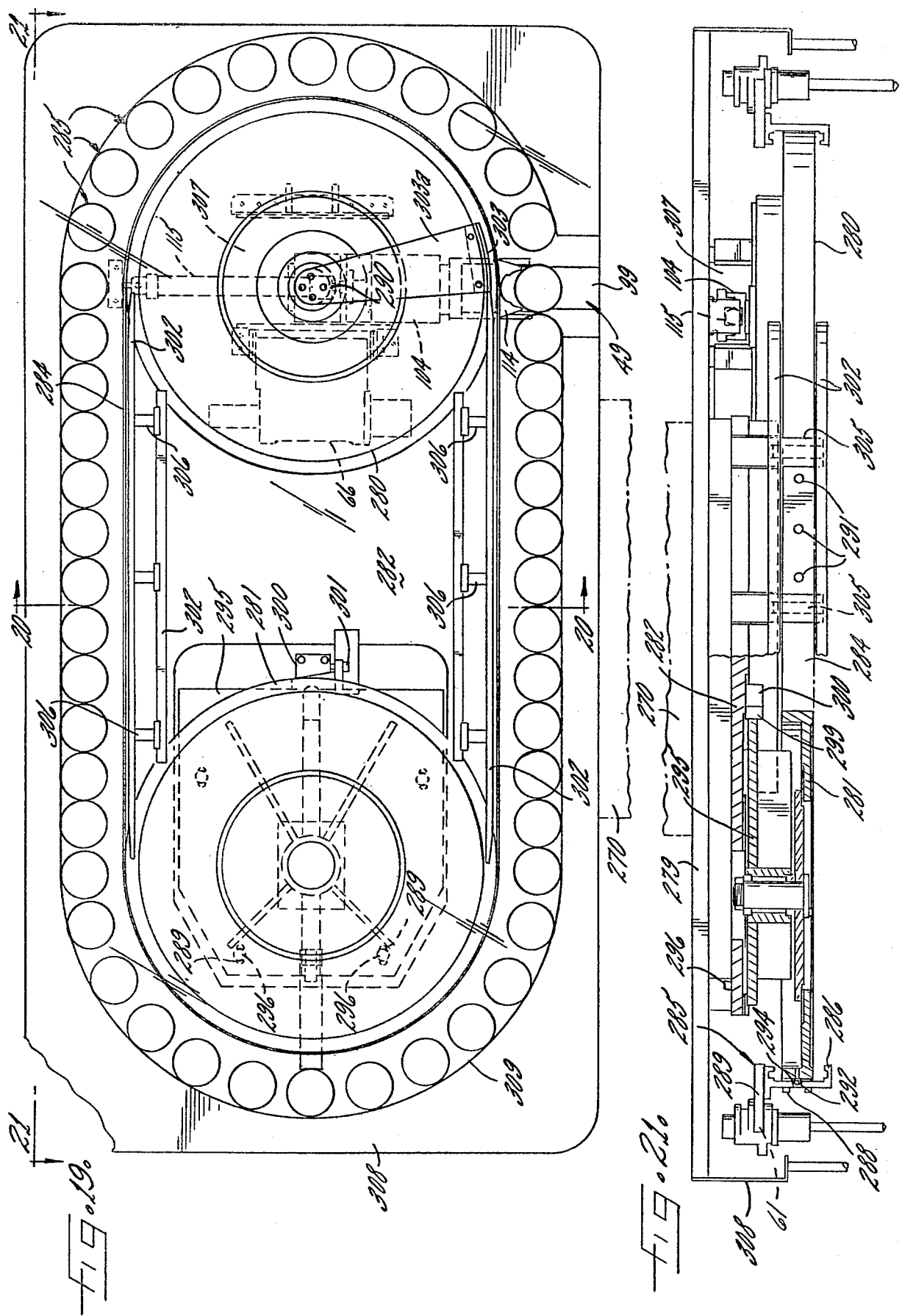

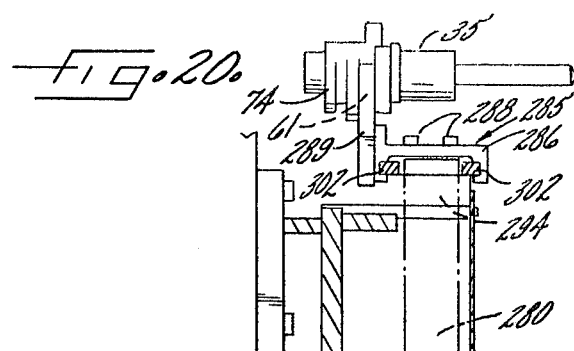
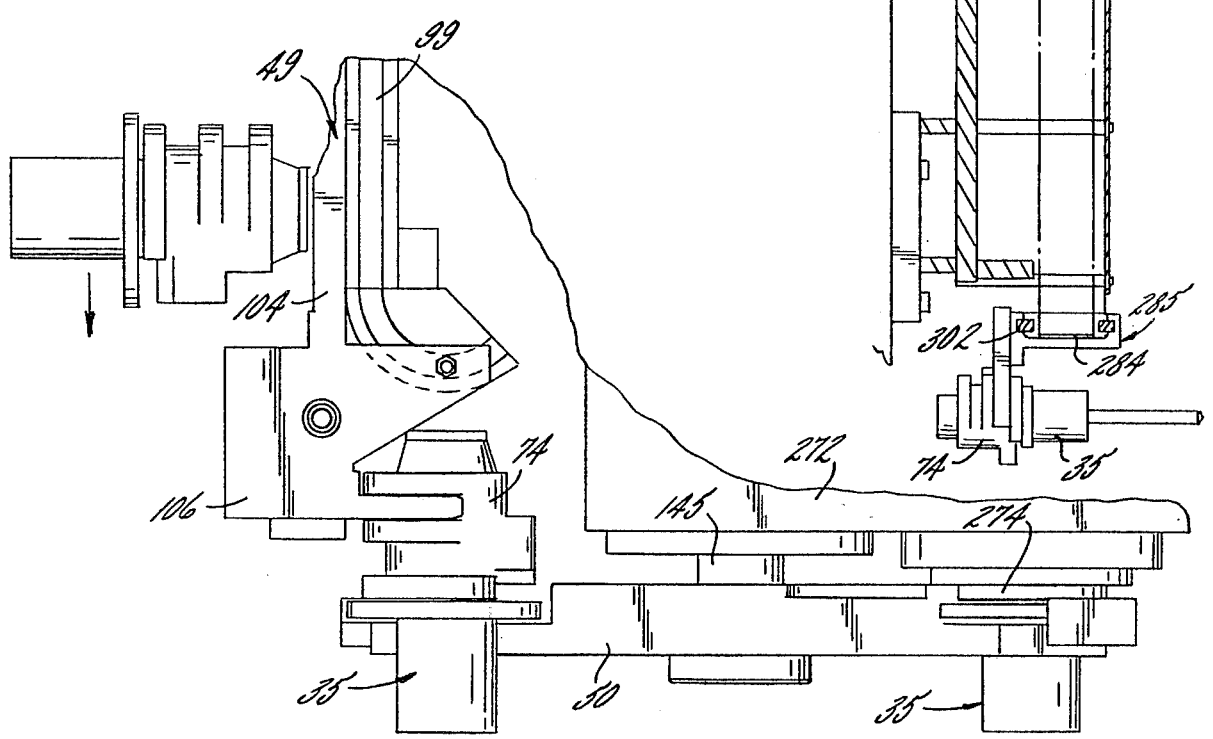
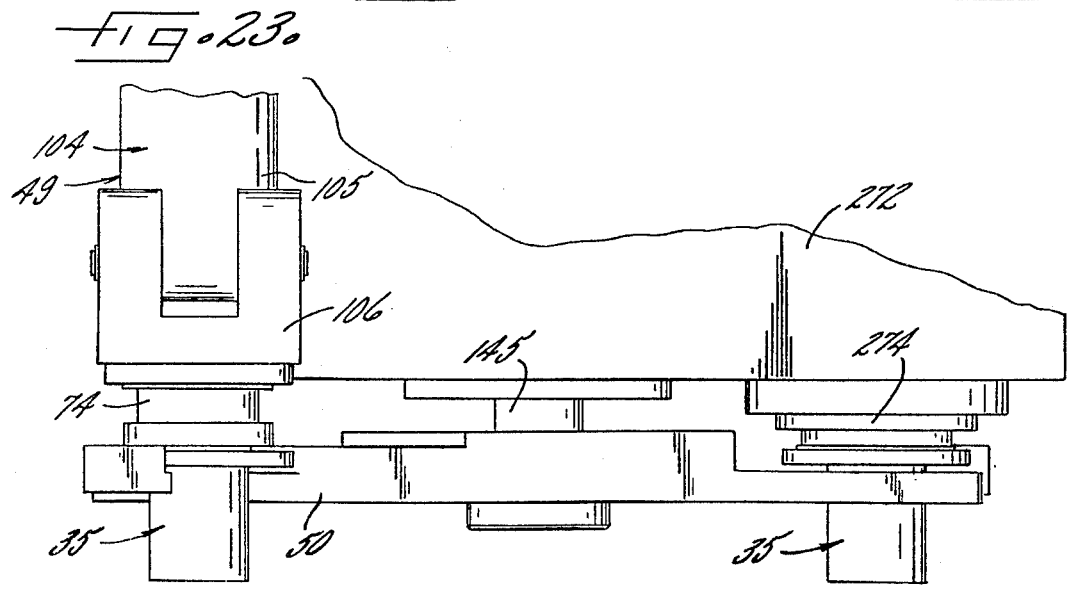

TOOL CHANGER MACHINING CENTER

This application is a continuation-in-part of my earlier co-pending application Ser. No. 721,115, filed Sept. 7, 1976, now abandoned.

DESCRIPTION OF THE INVENTION

The present invention relates in general to machine tools and, more specifically, to a multifunction machine tool known as a machining center. Such machines are capable of performing a variety of machining operations such as boring, drilling, milling, and tapping under a numerical control system. They are usually provided with automatic tool changer capability which is also under the numerical control system.

Automatic tool changing devices have been the subject of considerable activity heretofore. Many of them are unduly complex and require an excessive amount of time for a tool change by reason of the design, location, or operation of their tool storage matrices, shuttles, transfer arms or other components.

With the foregoing in mind, the general aim of the present invention is to provide a heavy duty horizontal spindle and vertical spindle machining center adapted to perform automated boring, drilling, milling, and tapping operations and incorporating an automatic tool changer of improved construction, operation, and efficiency.

More specifically, it is an object of the present invention to provide a machining center of the above type with an automatic tool changer that is compact, rugged, and positive in operation through the use of a mechanical latching system for supporting and transferring the toolholders.

Another object of the invention is to provide a machining center and automatic tool changer of the character set forth which is adapted to operate with toolholders interchangeable with those utilized in the tool changer of a current commercial vertical spindle machining center.

A further object of the invention is to provide a machining center and automatic tool changer of the above type wherein each toolholder is carried in an open tool cup in the tool storage matrix and in the tool shuttle, thereby protecting the precision shank of the toolholder during storage and transport to or from the tool change position.

Another object is to provide a machining center and automatic tool changer of the character set forth above which is adapted to operate with toolholders having a relatively short shank which contributes to optimum rigidity and tool clearance.

A further object of the invention is to provide a machining center and automatic tool changer as noted above wherein the tool exchange arm is mounted on the headstock and a compact mechanism is provided within the headstock to extend axially and to rotate the tool exchange arm.

Still another object is to provide a machining center and automatic tool changer of the character set forth above having a compact and quick acting drawbolt mechanism for releasably securing the toolholder in the machine spindle.

Other objects and advantages of the invention will become apparent from the description which follows, taken with the drawings, wherein:

FIG. 1a is an enlarged elevational view of an illustrative toolholder and cutting tool used in the machine shown in FIG. 1.

FIG. 4 is an enlarged fragmentary vertical sectional view through the tool storage matrix of the illustrative machine, taken in the plane of the line 4—4 in FIG. 3.

FIG. 4a is a further enlarged fragmentary elevational view detailing the resilient latch element of the matrix.

FIG. 6 is a side elevational view of the tool cup without a toolholder situated therein.

FIG. 6a is a vertical sectional view through the tool cup, taken in the plane of the line 6a—6a in FIG. 5.

FIG. 7 is an enlarged fragmentary horizontal sectional view through the magazine and shuttle mechanism, taken in the plane of the line 7—7 in FIG. 3.

FIG. 8 is a fragmentary elevational view of the shuttle mechanism, taken in the plane of the line 8—8 in FIG. 7.

FIG. 9 is a fragmentary horizontal sectional view through the shuttle mechanism and its guide track, taken in the plane of the line 9—9 in FIG. 8.

FIG. 10 is a plan view of the tool transfer arm with a pair of toolholders in the tool exchange position.

FIG. 11 is an end view of the tool transfer arm with a tool gripped therein, taken in the plane of the line 11—11 in FIG. 10.

FIG. 12 is a front elevational view of the transfer arm, taken in the plane of the line 12—12 in FIG. 10.

FIG. 13 is a vertical sectional view through the hub of the transfer arm and its extension mechanism with the latter shown partially in elevation taken in the plane of the line 13—13 in FIG. 2.

FIG. 15 is a transverse sectional view through the shaft of the transfer arm showing the arm rotating mechanism in elevation.

FIG. 16 is an enlarged, fragmentary sectional view taken axially of the spindle of the illustrative machine of FIG. 1 in the plane of the line 16—16, showing the power drawbolt mechanism.

FIG. 17 is a front elevational view of an illustrative vertical spindle machining center equipped with an automatic tool changer and embodying another aspect of the present invention.

FIG. 18 is an elevational view of the left side of the machine as shown in FIG. 17.

FIG. 19 is a side elevational view of the tool magazine of the illustrative machine shown in FIG. 17.

FIG. 20 is a vertical sectional view through the magazine shown in FIG. 19, taken in the plane of the line 20—20.

FIG. 21 is a plan view of the magazine shown in FIG. 19, with the left hand portion shown in horizontal section.

FIG. 22 is an enlarged fragmentary front elevational view of the headstock, tool transfer arm, shuttle mechanism and magazine in the course of a tool change.

FIG. 23 is an enlarged fragmentary side elevational view of the headstock and tool changer components shown in FIG. 22.

Figure 1:
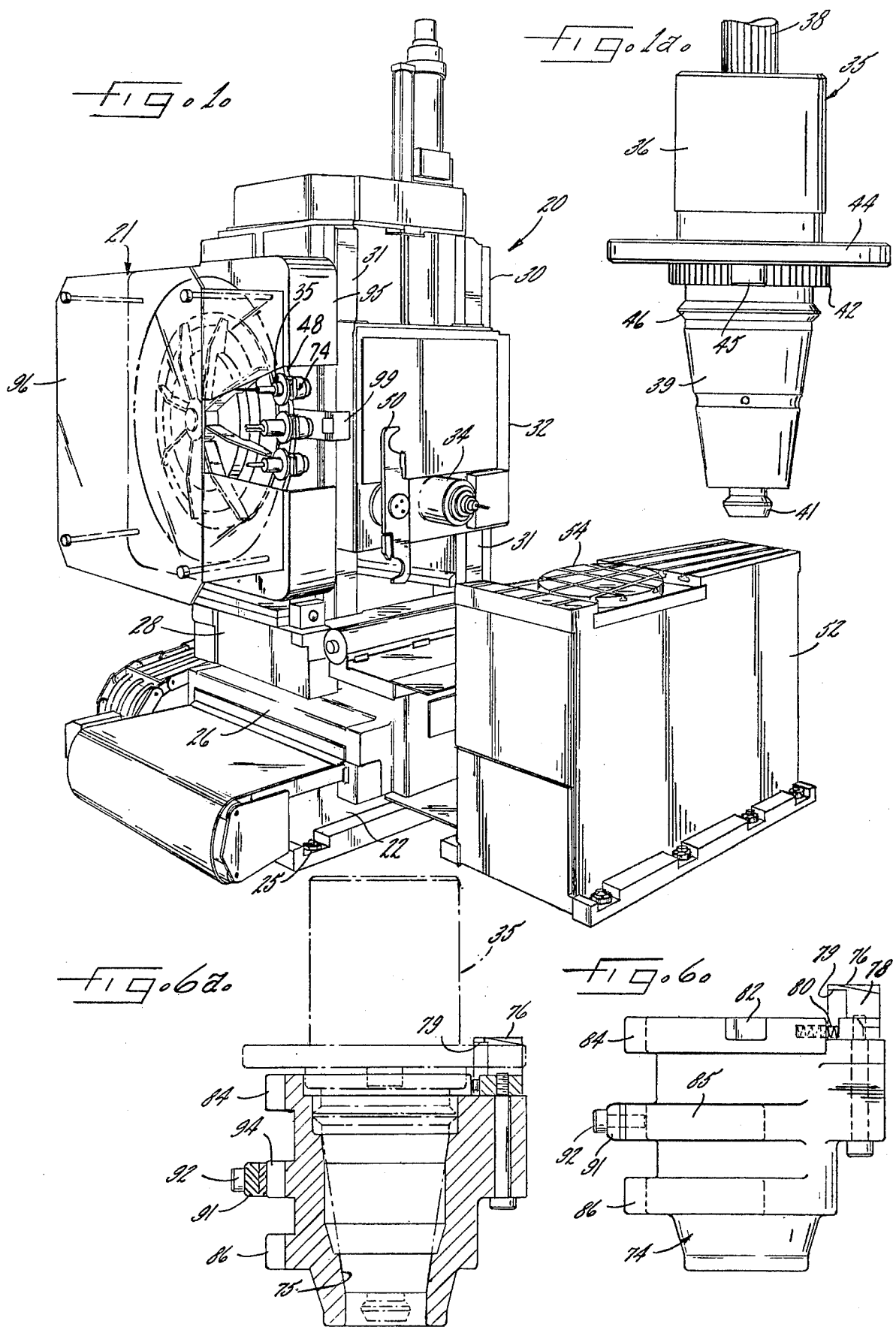
FIG. 1 is a perspective view of an illustrative horizontal spindle machining center equipped with an automatic tool changer and exemplifying one aspect of the present invention.

While the invention is susceptible of various modifications and alternative constructions, certain illustrative embodiments have been shown in the drawings and will be described below in considerable detail. It should be understood, however, that there is no intention to limit the invention to the specific forms described but, on the contrary, the intention is to cover all modifications, alternative constructions, and equivalents falling within the scope of the appended claims.

GENERAL ORGANIZATION OF HORIZONTAL SPINDLE MACHINE

Figure 2:
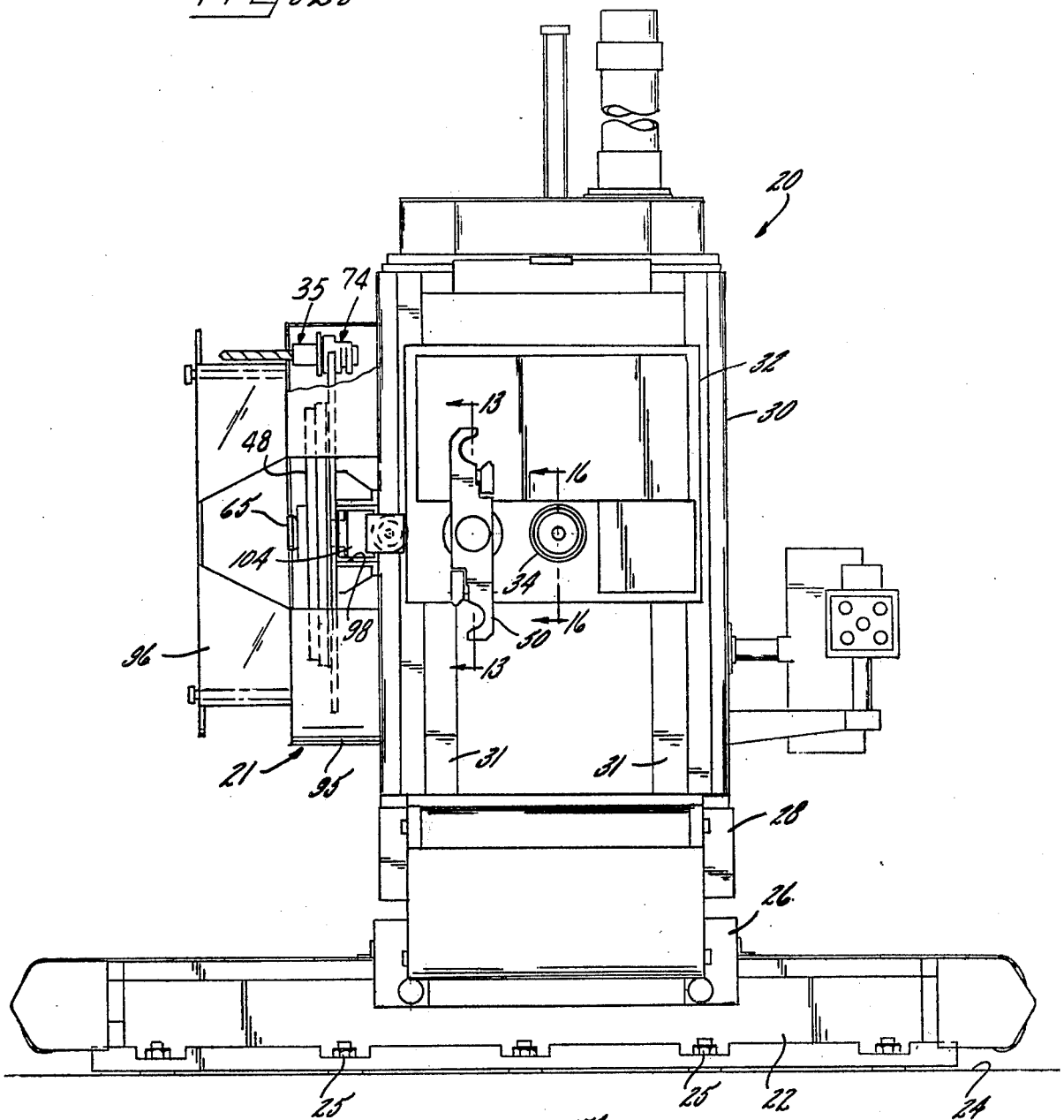
FIG. 2 is a front elevational view of the illustrative machine shown in FIG. 1.
Figure 3:
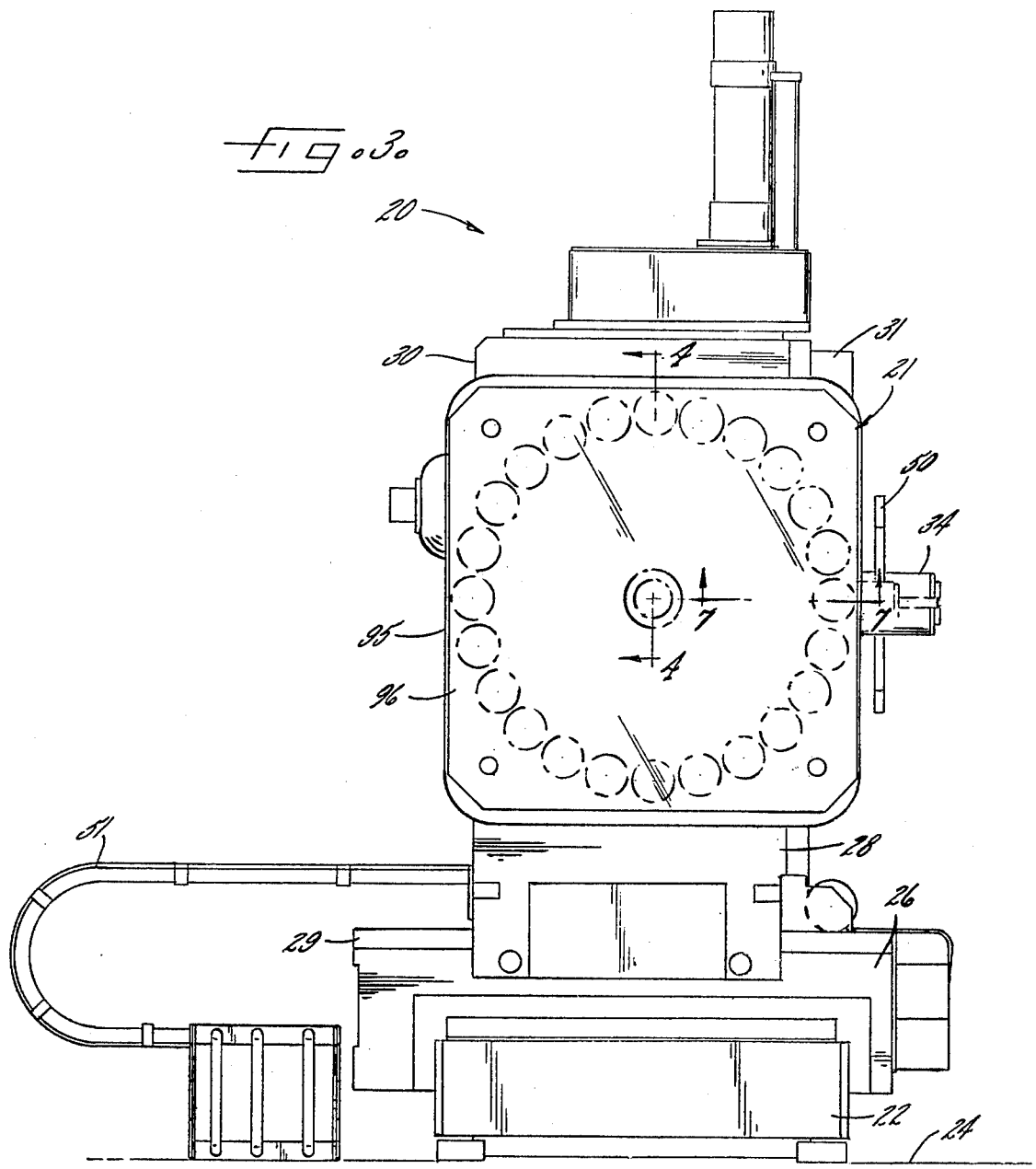
FIG. 3 is a side elevational view of the machine shown in FIG. 1.

Referring more specifically to FIGS. 1 to 3, the invention is there exemplified in an illustrative heavy duty machining center 20 which incorporates an automatic tool changer 21. The machining center 20 is a horizontal spindle unit and in this instance happens to be a floor type machine. It is adapted to perform boring, drilling, milling and tapping operations, as well as automatic tool changing, all under numerical control.

The machining center 20 utilizes a horizontal base or runway 22 supported on the foundation 24 and provided with leveling mechanisms 25. It includes a saddle 26 supported on antifriction rollers and ways (not shown) on the runway 22 for translational movement longitudinally of the runway, and a cross slide 28 translatably supported by antifriction rollers (not shown) and ways 29 on the saddle for movement along an axis perpendicular to the longitudinal axis of the runway. A split column 30 is fixed in upstanding relation on the cross slide 28 and is formed with vertical ways 31 which support a vertically translatable headstock 32. The headstock 32 carries a horizontal tool spindle 34 which is a rotatably supported therein on antifriction bearings. The spindle 34 is fashioned with an appropriately tapered socket for receiving and engaging the tapered shanks of the toolholders used for machining operations.

A typical toolholder 34 used in the machining center 20 is illustrated in FIG. 1a. The toolholder 35 comprises a body 36 in which a milling cutter 38 or other tool is securely clamped, and a precision tapered shank 39 adapted to fit into a mating socket 40 in the spindle 34, and a tapered knob 41 adapted to be engaged by a power drawbolt. The toolholer also includes drive teeth 42 for engaging corresponding teeth in the spindle socket, a gripping flange 44, and an orientation button 45 fixed to the flange 44. It may also have a peripheral rib 46 spaced slightly below the drive teeth which serves as a retaining device when the toolholder is used in a vertical spindle machine.

The automatic tool changer 21 of the machining center 20 comprises a tool storage matrix 48 mounted on the column, a tool carriage or shuttle 49, also mounted on the column, and a two-handed tool exchange arm 50 mounted on the headstock. The exchange arm 50 is adapted to move axially in a direction parallel to the rotational axis of the spindle 34 and to rotate in planes perpendicular to the axis of the spindle. Its function is to transfer tools between the shuttle and the spindle.

Service lines for electric power and control, hydraulic power, and air are led to the machining center by means of a flexible tray unit 51 connected to the cross slide 28.

A work table 52 is mounted in front of the machining center 20 and is formed with a number of T-slots for securing a workpiece thereto. The work table in this case happens to be of the rotary type including an indexable platen 54 which is adapted to present several sides of the workpiece to the cutting tools so as to minimize set up time.

TOOL STORAGE MATRIX AND TOOL CUP

The tool storage matrix 48 (FIGS. 1-4) in this case is formed as a large drum wheel supported for rotation about a horizontal axis on an extension housing 55 bolted or otherwise rigidly fixed to the side of the column 30 as by mounting pads 56. The matrix 48 (FIG. 4) is fabricated as a weldment comprising a hub 58, a reinforced central web 59, and an outer annular rim 60. The rim 60 has in this instance twenty-four outwardly opening pockets 61 for storing a corresponding number of toolholders and moving them in a curved path with their axes perpendicular to a vertical plane passing through the spindle axis. The matrix hub 58 is journaled on a pair of antifriction bearings 62 on fixed shaft 64 which projects outwardly from the extension housing, being retained axially on the shaft by nut 65.

The matrix 48 is rotated by means of a drive unit 66 (FIG. 4) mounted on the side of the column 30 as by means of bolts or cap screws (not shown). The drive unit comprises a hydraulic motor (not shown) connected to worm shaft 68 which drives worm wheel 69, pinion shaft 70, and drive pinion 71. The latter drivingly engages a ring gear 72 centered on the hub 58 and fixed to the inner side of the matrix. In the present case, the worm shaft 68 is coupled to a transducer (not shown) which signals the angular position of the matrix and the pockets 61.

Figure 5:
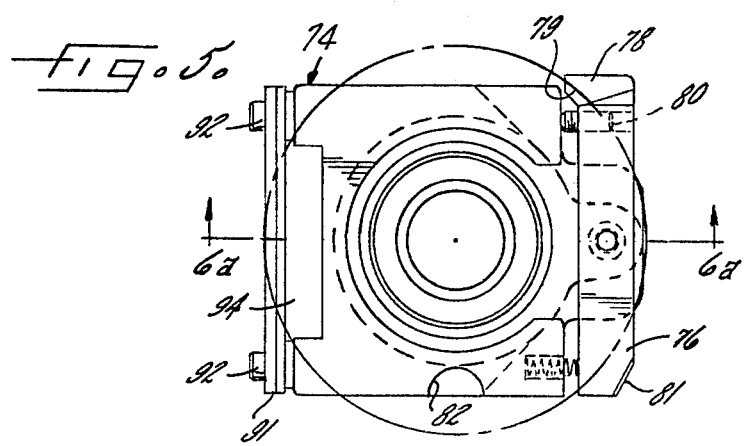
FIG. 5 is a horizontal sectional view through a toolholder supporting tool cup, taken in the plane of the line 5—5 in FIG. 7.

The toolholders 35 are stored in the matrix 48 and transported to or from the latter in tool cups 74 (FIG. 6). The cups 74 may be formed of material of lesser hardness than the toolholder shanks 39 such as a tough, durable plastic. Angular orientation of the toolholder 35 in the tool cup 74 is maintained by means of orientation notch 82 which emgages the orientation button 45 of the toolholder. Referring more specifically to FIGS. 5, 6, and 6a, it will be noted that each tool cup 74 comprises a receptacle having a tapered socket 75 adapted to receive the corresponding tapered shank 39 of a toolholder 35 and to retain the latter until released in the course of a tool change. A latch 76 is mounted for horizontal pivoting movement on the top of the tool cup. One end of the latch is formed with an upstanding abutment 78 having an undercut shoulder 79 adapted to overlie the toolholder flange 44, and thus positively secure the toolholder in the tool cup. The latch 76 is spring biased so as to press the abutment 78 against the periphery of the toolholder flange. The amount of overhang of the undercut shoulder 79 may be adjusted by means of set screw 80. The opposite end of the latch 76 is formed with a beveled cam surface 81 for releasing the latch upon engagement of the toolholder by the tool exchange arm 50. The set screw 80 may also be used to align the cam surface 81 with its coacting abutment on the tool exchange arm.

The tool cup 74 is formed with three axially spaced, external flanges 84, 85, and 86 which may extend approximately three fourths of the way around the outer periphery of the cup. The flange 84 supports the tool cup 74 when the cup is inserted in matrix pocket 61. The flange 85 supports the tool cup within the shuttle 49 and the flange 86 defines a locating abutment for precisely positioning the tool cup in the shuttle.

Provision is made for releasably latching each tool cup 74 in a pocket 61 of the matrix as an incident to insertion of the tool cup. This is accomplished in the present instance by means of a resilient latch element 88 fixed as by screw 87 in a radial slot on the inner surface of the matrix rim 60 and extending radially toward the pocket 61 (FIGS. 4, 4a, 7). The latch 88 has a fixed end, a central section serving as a spring arm, and an outer end portion formed with a beveled cam 89 and a transverse shoulder constituting a hook 90 (FIG. 4a). Cooperating with the cam 89 and hook 90 is a catch bar 91 fixed to the middle flange 85 of the tool cup 74 as by screws 92. The upper surface of the catch bar 91 is beveled for free sliding engagement with the cam 89. The flange 85 has a clearance aperture 94 for receiving the cam 89 (FIG. 5) with the hook 90 engaging the rear face of the catch bar 91.

For purposes of safety, the matrix 48 is enclosed in a peripheral casing 95 of relatively heavy sheet metal with an opening only in the vicinity of the tool change station. The outboard face of the casing 95 may be enclosed by a heavy cover 96 of transparent plastic material (FIGS. 1–3), permitting ready observation of the stored tools.

TRANSPORT SHUTTLE

The transport shuttle mechanism 49 (FIGS. 1, 2, 7–9) is adapted to ferry toolholders ad their supporting tool cups 74 back and forth between the tool storage matrix 48 and the tool exchange arm 50. The shuttle mechanism 49 is nested between the matrix 48 and the column 30 in a tunnel 98 extending radially of the curved path of the toolholders, the tunnel being formed in the extension housing 55 (FIGS. 2 and 4). The mechanism 49 comprises a track 99 having a straight portion and a curved outboard portion which is cantilevered partially around the front face of the column 30. The track 99 (FIG. 9) is rigidly secured to the column 30 as by means of cap screws 100 having spacers 101 around them for obtaining accurate alinement between the track and the matrix. Guide grooves 102 are formed in the opposed side walls of the track and they extend along both its straight and arcuate portions. The track 99 lies in a plane passing through the axis of the tool storage matrix and is parallel to the axis of the tool spindle. When the headstock is in tool change position, the track lies in a plane defined by the axes of the matrix and the spindle.

A tool carriage 104 (FIGS. 7–9) is mounted for longitudinal sliding movement on the track 99, the latter being suitably lubricated for this purpose. The carriage 104 comprises a saddle 105 and a pivotal head 106 adapted to engage a tool cup 74. The saddle is retained on the track in this instance by means of opposed gib plates 108 secured by cap screws 109 to its underside and extending into the guide grooves 102. The head 106 is pivotally secured to the forward end of the saddle as by means of transverse pin 110. The forward end of the head 106 is constrained to follow the guide grooves 102 by rollers 111 which are mounted in the guide grooves and secured to the head 106 by bolts 112. The head 106 includes a forwardly projecting fork 114 for engaging a tool cup 74 and traversing it between the storage matrix and the tool exchange arm.

The tool carriage 104 is power driven along the track 99 as by means of a hydraulic actuator 115 connected at one end to a bracket 116 fixed to the column 30 and at the other end to a coupling 118 mounted on the saddle 105. Extension of the piston rod of actuator 115 serves to move the tool carriage 104 along the track toward the front face of the column 30. By reason of the curvature of the track 99 at its outboard end, the pivotal head 106 is moved through an angle of 90°, changing the orientation of the tool cup 74 and toolholder therein from parallelism with the axis of the matrix 48 to parallelism with the axis of the spindle 34.

For the purpose of attaching the tool cup 74 to the tool carriage 104, a resilient latch member 119 is mounted on top of the pivotal head 106 and secured as by screws 120 (FIGS. 7–9). The latch member 119 is provided with an oblong central orifice defining a pair of laterally spaced spring arms in its intermediate portion. The forward end of the latch member 119 is formed with a raised cam 121 terminating in a transverse shoulder defining a hook 122. The latch member 119 is nested in a longitudinal slot 124 on top of the head and disposed so that its raised cam 121 will intercept the beveled lower edge of the catch bar 91 on the tool cup 74 as the fork 114 slides under the middle tool cup flange 85. At the point of full abutting engagement between the tool cup and a mating concave stop shoulder 125 in the fork 114, the cam 121 springs up into the aperture behind the catch bar 91 and the hook 122 engages the latter. Under this condition, the tool carriage is fully engaged with the tool cup.

Provision is made in the transport shuttle mechanism for releasing the matrix latch 88 as an incident to extracting a tool cup 74 from the matrix by the tool carriage, and for releasing the tool carriage latch 119 as an incident to inserting a tool cup 74 in the matrix by the tool carriage. In keeping with this objective, the actuator coupling 118 on the saddle 105 is formed so as to provide a predetermined amount of lost motion between the actuator and the saddle in both the forward and rearward directions. This is accomplished in the present instance by connecting the forward end of the actuator piston rod to a tie bolt 126 having a reduced central portion 128 which carries a bushing 129 of resilient material such as neoprene rubber and end washers 130. The tie bolt 126 extends through a pair of alined apertures in the upstanding lugs 131 of a yoke 132 rigidly fixed to the saddle 105, the resilient bushing being nested between the lugs 131. The end of the tie bolt 126 remote from the actuator is threadedly connected to a latch releasing mechanism 134.

The mechanism 134 in this case comprises a lever 135 (FIGS. 7–9) in the form of a rectangular block pivotally mounted on top of the head 106 between a pair of trunion blocks 136. One end of the lever 135 abuts against a projection 138 on top of the tool carriage latch 119. The opposite end of the lever 135 has a depending rod 139 fixed thereto and extending downwardly through the head 106 to releasably engage an aperture 140 in the forward end of a flat bar 141 slidably supported on the saddle 105. The opposite end of the sliding bar 141 is formed with an upstanding lug 142 adjustably connected as by threads to the projecting end of the tie bolt 126 remote from the actuator 115. The lever 135 is biased against the abutment 138 on the shuttle latch 119 by means of a biasing spring 144 housed in a recess in the head and bearing against the depending rod 139.

With the construction just described, movement of the tool carriage 104 into full engagement with a cup 74 in the matrix will serve to latch the cup to the tool carriage. The coupling between the actuator 115 and the saddle 105 then deflects, allowing the piston rod of the actuator and the tie bolt to overtravel to the right (as viewed in FIGS. 7–9) about 0.1 inch relative to the saddle. This motion is transmitted via the sliding bar 141 and depending rod 139 to swing the pivoted lever 135 upwardly against the matrix latch 88, thereby releasing the tool cup from the matrix. The tool carriage 104 thereupon extracts the tool cup and its toolholder from the matrix and transports them to the tool exchange position in front of the column.

Upon reversal of the foregoing motion, with the tool carriage returning a cup and its toolholder to the matrix, the returning cup engages the matrix pocket 61 and the matrix latch 88 cams over and engages the catch bar 91 on the tool cup. Since the tool carriage is still latched to the tool cup, the piston rod of the actuator and its tie bolt will continue to move to the left (as viewed in FIGS. 7–9) about 0.1 inch relative to the saddle. This produces an inward rocking or clockwise movement of the lever 135, depressing the tool carriage latch 119 and thereby releasing the tool cup from the carriage. The tool carriage then continues moving rearwardly to its parked position.

It should be appreciated that the matrix 48 must rotate to bring a tool cup with a new tool, or a tool cup for an old tool, into the tool transfer station while the tool carriage 104 is at either extreme of its travel on track 99. As shown in FIG. 7, there is ample clearance for matrix rotation in either position of the carriage 104.

TOOL EXCHANGE ARM

The tool exchange arm 50 (FIGS. 1–3, 10, 12) is supported by a shaft 145 extending from the front face of the headstock 32 in parallel alinement with the spindle 34. The arm 50 is fixed to the outer end portion of the shaft 145 in this instance by means of a circular plate 146 secured to both the arm and the shaft by cap screws 148. The shaft 145 and arm 50 are axially extensible to a tool pick-up position, and further to a tool exchange position. The shaft 145 and arm 50 are also angularly indexable through 180° for tool pick-up and exchange, and also indexable through 90° to a vertical or park position.

For receiving tools, or more specifically tool holders 35, the outer ends of the arm 50 are formed with oppositely projecting pockets 149 (FIG. 12). Since both ends of the arm 50 are identical, a description of one will suffice for both. The pocket 149 is bounded by an end block 150, a side block 151 disposed at approximately 90° to the block 150, and a rotatable spool 152 disposed at approximately 90° to the side block 151. Each of the blocks 150, 151 and the spool 152 is formed with a groove lying in a common plane and adapted to receive the flange 44 of a tool holder 35. The tool holder 35 is releasably secured in the pocket 149 by means of a latch 154 having an arcuate face 155 adapted to engage the tool holder flange 44 in an area which maintains it in an engagement with the blocks 150, 151 and the spool 152. The latch 154 is pivotally mounted on the arm 50 as by means of shoulder bolt 156 and biased into a normally engaged position against stop 157 by means of tensile spring 158 connected between cap screws 159 on the latch and 160 on the arm. The side of the latch bar 154 facing the headstock is formed with a tapered cam surface 161 which is engaged by the toolholder flange 44 to pivot the bar 154 from its normally engaged position to permit entry of the flange 44 into the groove of the pocket members 150, 151 and 152.

Provision is made for automatically releasing the toolholders 35 from the pockets 149 of arm 50 at the spindle 34, or at the tool carriage 104, after a tool exchange. This is accomplished at the spindle by means of a depending lug 162 fixed to a transverse shoulder on the side of the latch bar 154 facing the headstock (FIG. 10). Upon insertion of the tool 35 into the spindle, the lug 162 is accosted by the front face of the spindle cover as the arm 50 moves axially toward it, causing the latch bar 154 to be pivoted to its released position and permitting the arm to be swung clear of the toolholder. At the tool carriage 104, when the toolholder 35 at the opposite end of the arm is inserted into the tool cup 74 of the carriage 104, the surface 161 of latch 154 is accosted by the top of abutment 78 which pivots the latch 154 to its released position and permits the arm 50 to be rotated freely away from the toolholder.

Conversely, when a toolholder 35 is to be picked up by the arm 50 from the tool cup 74 of the carriage, provision is made for automatically releasing the tool cup latch 76 as an incident to rotation of the arm into engagement with the flange 44 of the toolholder 35 in the tool cup. This is accomplished by means of a depending tapered pin 164 adjacent each pocket 149 of the arm 50. As the arm rotates into engagement with the flange 44 of the toolholder 35, the tapered pin 164 strikes the cam surface 81 of the tool cup latch 76, releasing the latter as the latch bar 154 of the arm secures the toolholder flange in the pocket 149. The toolholder 35 may then be readily extracted axially from the tool cup 74.

Figure 14:
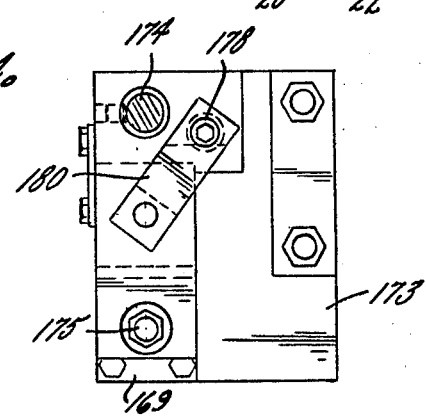
FIG. 14 is a transverse view taken through the transfer arm extension mechanism of FIG. 13 in the plane of the line 14—14.

For the purpose of axially extending and for indexing the exchange arm 50, two relatively compact mechanisms are provided within the headstock housing. Referring more specifically to FIG. 13, it will be noted that the tool exchange shaft 145 is formed with a longitudinally splined section 165 which extends for the greater part of its length. The section 165 engages a correspondingly splined hub 166 journaled on antifriction bearings within a cartridge 168 mounted in the headstock housing. The inner end of the shaft 145 is connected to a pair of hydraulic actuators 169, 170 by means of a rotary coupling 171. Actuator 169 is interposed between a fixed mounting plate 172 and a slidable bracket 173 supported on a guide rod 174, being connected to the bracket 173 by piston rod 175 (FIGS. 13, 14). The bracket 173, in turn, is connected to the rotary coupling 171 by means of the actuator 170, the body of which is secured to the slidable bracket 173 and the piston rod of which is secured to the rotary coupling 171. The rearward end of the actuator 170 is slidably supported on guide rod 174 by a slidable bracket 176. A control rod 178 with a cam surface 179 for operating a limit switch 180 is also connected to the end of the shaft 145 by a bracket 181 extending between the rotary coupling 171 and a shoulder on the control rod 178.

By reason of this construction, the actuator 169 functions to extend the exchange arm shaft and the arm 50 from its parked position to a tool pick-up position for engaging tool holders in the spindle and in the tool carriage at the outboard end of the shuttle track. The actuator 170 functions to axially position the exchange arm to extract and replace toolholders in the spindle and in the cup 74 of the tool carriage at the outboard end of the shuttle track. The exchange arm indexing mechanism (FIGS. 13, 15) is adapted to rotate the arm 50 through 90 degrees for parking and through 180 degrees for tool exchange. It comprises a pinion 182, integral with the splined hub 166 on the exchange shaft 145, driven by a meshing rack 184 translatably supported on rollers 185, 186. First and second hydraulic actuators 188, 189 are operated selectively to position the rack 184, and thus index the exchange arm 50. Both of the actuators are fixed at one end to the headstock through an adjustable support 190. The piston rod 191 of the first actuator is secured to a yoke 192 having a floating pinion 194 journaled therein which meshes with the rack 184 and a second rack 195. The latter is translatably supported on rollers 196 and driven by the piston rod 198 of the second actuator 189. The floating pinion 194 is interposed between the racks 184, 195 for driving engagement therewith. A plurality of limit switches 199, 200, 201 mounted on the yoke sense the position of the racks as the arm 50 is indexed.

The piston rods 191, 198 of the actuators 188, 189 have equal strokes and each is operated so as to assume a fully extended or a fully retracted position. The mechanical relationship of the drive between the actuators is such that operation of the actuator 188 will produce 180 degrees of rotation of the arm shaft 145 for tool exchange. Operation of the actuator 189 will produce 90 degrees of rotation for moving the arm 50 into or out of the vertical parked position. When the actuators 188, 189 are positioned as illustrated in FIG. 15, the tool exchange arm is in the vertical parked position.

POWER DRAWBOLT

The spindle 34 includes a power operated drawbolt mechanism 202 (FIG. 16) for releaseably securing the toolholders 35 in the tapered spindle socket 40. The mechanism 202 comprises a drawbolt 204 supported coaxially within the spindle for axial movement in a splined coupling 205. The forward end of the drawbolt is formed with a head 206 coupled to fingers 208 projecting into the spindle socket 40. The fingers are formed to receive the knob 41 projecting from the rearward end of the toolholder shank. When extended forwardly, the fingers open to receive or release the knob 41. Springs in the head bias the outer ends of the fingers into camming engagement with the inner wall of the tapered spindle socket 40.

The inner end of the drawbolt 204 is formed with an Acme screw thread 209 which engages a nut 210 housed within a bore 211 in the spindle. Thrust bearing 212 is interposed between the forward end of the nut and a shoulder 213 in the spindle. The nut is rotatably driven by a reversible drive shaft 214 having a splined connection 215 with the inner end of the nut. The nut includes right and left hand sections permanently coupled for limited relative axial movement by interfitting clutch teeth biased axially apart by springs 216. The inner end of the drawbolt is formed with an enlarged head 218 disposed in a cavity within the nut and serves to preclude disengagement of the drawbolt from the nut. The clutch teeth permit the drawbolt 204 to be moved rearwardly under the influence of a toolholder 35 inserted into the spindle socket, whereby drive teeth 42 of the tool engage the teeth 219 of the spingle prior to operation of the drawbolt.

The drawbolt drive shaft 214 is reversibly driven by hydraulic motor 220 through a dogtooth clutch 221 operated by hydraulic actuator 222 through yoke 224. The clutch 221 has a splined connection with a drive sleeve 225 which, in turn, has a splined connection with the drawbolt drive shaft 214. To preclude driving torque on the spindle from the motor 220 during drawbolt operation, while permitting it for spindle orientation, an outer sleeve 226 envelops the drive sleeve 225 and has a splined connection 228 with spindle drive sleeve 229. The outer sleeve is normally urged by biasing spring 230 into frictional engagement with the driven element of the clutch 221. During drawbolt operation, hydraulic actuator 231, acting through arm 232, urges the outer sleeve 226 forward and separates it from the clutch element 221. Power from hydraulic motor 220 is thus transmitted directly to the drawbolt to engage or disengage the same, with no torque applied to the spindle by motor 220.

The drawbolt mechanism 202 is adapted to provide positive ejection of the toolholder 35 from the spindle socket to facilitate tool changing. With a toolholder clamped in the spindle socket, the left hand end surface of the nut 210 is forced against the thrust bearing. The right hand end surface of the nut is always located against the fixed shoulder 234 of the spindle. To release the toolholder, the hydraulic motor 220 is operated to rotate the nut so that the threaded section moves rearwardly until the lost motion in the coupling between the nut sections is taken up. At that point, a positive axial ejection force is applied to the knob 41 of the toolholder.

As indicated above, the motor 220 is also used in orienting the spindle 34 to the predetermined angular position required for alining the positive drive teeth 42 of the toolholder 35 with the drive teeth 219 of the spindle socket. The angular oriented position of the spindle is established by a shot pin 235. For orientation, the spindle has a notched flange 236 formed with a shoulder 238. Upon clockwise rotation of the spindle with the actuator 239 energized to overcome the bias of spring 240, the shot pin 235 will ride the periphery of the flange until it falls into the notch and engages the shoulder 238 for positive orientation of the spindle.

AUXILIARY SERVICES TO SPINDLE

Provision is made in the machining center 20 for supplying coolant to the cutting tool via the spindle. The coolant is introduced into a fixed collar 241 secured to the face of the headstock in surrounding relation with the end of the spindle. It passes between a pair of annular graphite sealing rings 242 and into a passage 244 leading to the spindle socket 40. Coolant from the passage 244 enters peripheral groove 245 in the toolholder shank and then flows into connecting passage 246 within the toolholder, ultimately being discharged at the cutting tool.

Pressurized air is supplied to the spindle for two purposes. The first is to blow foreign material out of the spindle socket and off of the toolholder shank. The second is to provide an input to the control system to signal the presence or absence of a toolholder shank correctly seated in the spindle socket.

The pressurized air is introduced via a passage 248 which directs it between two sealing rings 249, thence through a radial passage in the spindle sleeve, and then into the space surrounding the drawbolt shaft 214. It then enters axial passage 250 in shaft 214, flows into the nut 210, past the threads 209 and splines of coupling 205, and into the spindle socket 40.

SYNOPSIS OF OPERATION—HORIZONTAL MACHINE

For purposes of summarizing the operation of the machine 20 with the automatic tool changer 21, it will be assumed that the machine has just completed a machining cycle with the old tool (actually a toolholder 35) in the spindle 34 and the control has called for a tool change. The following sequence occurs:

(1) The headstock 32 shifts from the machining position indicated in FIG. 1 to the tool change position indicated in FIGS. 2 and 3 so as to bring the axis of the spindle into the same horizontal plane as the axis of the shuttle track 99. The spindle cases its normal rotation and becomes oriented for tool change by engagement of the shot pin 235 and orientation shoulder 238.

(2) Tool carriage 104 is moved outwardly by extending actuator 115, extracting a new tool (actually a toolholder and its tool cup) from the matrix, turning it 90 degrees, and presenting it at the front of the column with its axis parallel to that of the spindle. The tool exchange arm 50 is moved axially outward from its park position at the headstock by the actuator 169. The matrix 48 is rotated to position an empty pocket at the tool transfer station for the old tool and its tool cup.

(3) The tool exchange arm 50 is rotated clockwise (as viewed in FIG. 1) 90 degrees by extending actuator 189 to engage the tools in the spindle and the tool carriage. The drawbolt mechanism 202 releases the old tool in the spindle and the arm 50 releases the tool cup latch of the new tool in the carriage.

(4) The exchange arm 50 is moved axially outward by actuator 170, extracting the tools from the spindle and the tool carriage.

(5) The exchange arm 50 is rotated clockwise 180 degrees by retracting actuator 188, exchanging the positions of the old and the new tools.

(6) The exchange arm 50 is retracted axially by actuator 170, inserting the new tool in the spindle and the old tool in the empty tool cup on the tool carriage. The power drawbolt mechanism 202 engages the new tool in the spindle. The shot pin 235 is retracted from orientation shoulder 238.

(7) The exchange arm 50 is rotated counterclockwise 90 degrees to a vertical position by retracting actuator 189. The tool carriage 104, with the old tool latched in its tool cup, is moved inwardly by retracting actuator 115. This swings the old tool through 90 degrees and inserts the old tool and tool cup in the empty matrix pocket at the tool transfer station.

(8) With the new and the old tools secured in place, the headstock moves out of the tool change position and commences the next machining cycle.

GENERAL ORGANIZATION OF VERTICAL SPINDLE MACHINE

Referring next to FIGS. 17–23, there is shown an illustrative vertical spindle machining center 260 also embodying the present invention. The machine 260 is a numerically controlled multi-function machine tool which incorporates an automatic tool changer 261 similar to the tool changer 21 of the machine 20 described above. In this case, the machine 260 happens to be a floor type machine which is adapted to perform boring, drilling, milling and tapping operations, as well as automatic tool changing.

Since the machine 260 has a number of parts in common with the machine 20, like reference numerals will be used for the parts common to both machines and additional reference numerals will be used for the parts which are not common.

The machining center 260 (FIGS. 17 and 18) comprises a base 262 supported on an appropriate foundation 264 and having longitudinally extending ways (not shown) on its top side covered by telescoping way covers 265. A saddle 266 is slidably supported on the longitudinal ways of the base by means of antifriction rollers (not shown). The saddle 266 is provided with ways 268 on its top side extending transversely of the ways on the base. A cross slide or column base 269 is slidably supported by antifriction rollers (not shown) for sliding movement on the saddle ways 268. An upstanding column 270 is mounted on the cross slide 269 and is formed with vertical ways 271 which slidably support a vertically translatable headstock 272. The headstock includes a vertical tool spindle 274 which is rotatably supported on antifriction bearings and driven by spindle drive motor 275 on top of the headstock. A feed drive motor 276 mounted on the column is adapted to move the headstock vertically via a lead screw (not shown) between the column ways 271.

The automatic tool changer 261 in this instance comprises a tool storage matrix or magazine 278 mounted on the column 270 as by means of an overhanging support bracket 279 in the form of a generally rectangular plate (FIGS. 17, 18). It further comprises a tool carriage or shuttle 49, also mounted on the column, and a two-handed tool exchange arm 50 mounted on the headstock 272. The shuttle 49 and exchange arm 50 are substantially identical with those of the automatic tool changer 21 described earlier herein except for a differing orientation to accommodate the vertical spindle 274. The exchange arm 50 in the tool changer 261 is adapted to move axially in a direction parallel to the rotational axis of the spindle 274 and to rotate in planes normal to the rotational axis of the spindle. Its function is the same here as in the tool changer 21, namely, to transfer tools between the shuttle and the spindle. The machining center 260 and its automatic tool changer 261 are adapted to use toolholders 35 and tool cups 74 identical to those of the machine 20 described above.

The service lines for electric power and control, hydraulic power, and air are connected to the cross slide 269 of the machining center 260 via a flexible tray unit 51 similar to the one described above.

Work to be operated upon by the machining center 260 is set up on work table 52 located in front of the machine (FIG. 18). The table 52 is similar to that associated with the machine 20 and may include an indexable platen (not shown) to speed the set up procedure.

TOOL CAROUSEL STORAGE MATRIX

The tool storage matrix 278 (FIGS. 17–21 and 23) is of the carousel type and in the present instance is adapted to hold forty-eight of the toolholders 35 in their associated tool cups 74. The matrix 278 comprises a pair of drums 280, 281 journaled on inner support plate 282 for rotation about horizontal axes in a common vertical plane spaced outwardly from the side of the column. An endless flexible carrier band 284, in this case made of alloy steel, is trained around the drums 280, 281 for movement in unison therewith. The carrier band 284 has a plurality of tool receptacles 285 fixed in longitudinally spaced relation thereon for releasably supporting a series of toolholders 35 and their tool cups 74 and moving them in a curved path with their axes perpendicular to a vertical plane passing through the spindle axis.

Each of the tool receptacles 285 comprises a platen 286 rigidly fixed to the carrier band 284 as by bolts 288 (FIGS. 20, 21). The periphery of each drum is formed with appropriate recesses to register with the bolts 288 so that the band 284 remains in contact with the drum surface throughout the 180 degree arc of contact. Each platen has a socket member 289 fixed to the side thereof adjacent to the matrix support bracket 279 and extending parallel to the plane of the carrier band 284. The socket member 289 is shaped internally like the matrix pocket 61 of the tool changer 21 described earlier herein and is adapted to releasably engage the tool cup 74 between the flanges 84 and 85. The member 289 includes a resilient latch element 88 such as the one shown in FIGS. 4 and 4a which is adapted to cam into engagement with the catch bar 91 of the tool cup 74 as described above.

The drum 280, which serves as the matrix driver, is journaled on shaft 290 fixed to the inner support plate 282. Power is supplied to the drum 280 by means such as a hydraulic motor supported on the column and associated gearing similar to the arrangement shown in FIG. 4. In order to provide a positive drive between the drum 280 and the carrier band 284, the latter is formed with a series of longitudinally spaced apertures 291, each located at a platen 286 and adapted to register with corresponding radial lugs 292 spaced around the periphery of the drum 280. To accommodate the projecting lugs 292, each platen is formed with an appropriate clearance hole 294 (FIG. 21). The drum 281 is also formed with the spaced radial lugs 292 to assure engagement with the carrier band 284 (FIG. 21).

Tension in the carrier band 284 is controlled by adjustment of the spacing between the axes of the drums 280, 281. This is accomplished in the present instance by journaling the drum 281 on a mounting plate 295 adjustably secured to the inner support plate 282 as by clamping bolts 296 (FIG. 19). The mounting plate 295 may be shifted to the right or left as viewed in FIG. 19 to regulate band tension. Oblong clearance slots 298 in the support plate 282 associated with the bolts 296 accommodate such movement. Adjustment is accomplished by means of a pair of wedge blocks 299, 300, one fixed to the mounting plate 295 and the other fixed to the inner support plate 282. Relative movement between the wedge blocks is effected by adjusting screw 301 which is journaled in a bracket fixed to the block 299 and engages a tapped hole in the block 300.

Provision is made in the storage matrix 278 for supporting the straight reaches of the carrier band 284, and its toolholders and tool cups, between the drums 280, 281. In furtherance of this objective, a pair of laterally spaced guide bars 302 is mounted in straddling relation with each straight reach of the carrier band. The ends of each platen 286 are downwardly turned and formed with appropriate grooves 304 for slidably engaging the guide bars 302 (FIGS. 20, 21). The bars 302 are supported by spreader brackets 305 mounted on pedestals 306 fixed to the inner support plate 282.

In order to provide additional rigidity during tool change, the ends of the guide bars 302 at the tool change station are provided with arcuate extensions 303 which bridge the gap in support for the tool receptacle between the ends 302 and the drum 280. The extensions 303 are mounted on fixed brackets, the outer one 303a of which is attached to the fixed shaft 290.

The storage matrix 278, like the matrix 48, is enclosed within a peripheral casing 308 of relatively heavy sheet metal with an opening in the area of the tool change station (FIGS. 17–19, 21). The outboard face of the casing may be enclosed by a heavy cover 309 of transparent plastic material for observation of the stored tools.

TRANSPORT SHUTTLE AND EXCHANGE ARM—VERTICAL MACHINE

Referring further to FIGS. 18, 19 and 22, it will be noted that the tool transport shuttle mechanism 49 is incorporated in the machining center 260 and is adapted to ferry toolholders 35 and their tool cups 74 between the tool change station of the storage matrix 278 and the tool exchange arm 50 at the bottom of the headstock. This of course presupposes that the headstock 272 has been raised to tool change position. The shuttle mechanism 49 is mounted on the vertical center line of the drum 280 and nested in the tunnel 307 between the matrix support bracket 279 and the drum 280. The tunnel 307 and mechanism 49 extend radially of the curved path of the toolholders. The track 99 of the mechanism 49 is secured to the bracket 279 in any suitable manner with its upper end portion adjacent the tool change station and its lower end portion, including the curved section, extending in depending relation below the bracket 279. The track 99 lies in a plane passing through the axis of the matrix drum and parallel to the axis of the tool spindle. Thus the tool carriage 104 is adapted to extract from the matrix a tool cup and toolholder at the tool change station, and to transport them downwardly while swinging them through an angle of 90° for presentation to the tool exchange arm 50. As an incident to such movement, the axis of the toolholder is shifted from horizontal to vertical orientation.

The two handed tool exchange arm 50 is mounted in depending relation from the underside of the headstock 272 and is supported by its shaft 145 which has an axis parallel to that of the spindle 274. The shaft 145 and arm 50 are axially extensible from a park position adjacent the bottom of the headstock of a tool pick-up position spaced below the park position, and to a tool exchange position spaced below the pick-up position (FIGS. 17, 18, 22, 23). The shaft 145 and arm 50 may also be angularly indexed through an angle of 180° for tool pick-up and exchange, and are also indexable through a lesser angle to and from the park position. The outer ends of the arm 50 are formed with oppositely projecting pockets 149 and associated latching and releasing mechanisms described earlier herein. The arm is thus adapted to engage a toolholder in the tool cup and another toolholder in the spindle, to extract the toolholders from the tool cup and spindle, and to exchange their positions all in the manner described in connection with the horizontal spindle machine 20.

POWER DRAW BOLT—VERTICAL MACHINE

The spindle 274 of the vertical machine 260 includes a power operated draw bolt mechanism 202 which may, for example, be similar to that described above in connection with the horizontal machine 20. In the present instance, the draw bolt mechanism 202 is incorporated within the vertical spindle 274 and is driven by a power draw bolt motor 310 on top of the headstock. The power draw bolt is adapted to be used in the course of a tool change cycle for both clamping and releasing a toolholder in the spindle socket.

the mechanism 202 provides positive ejection of the toolholder 35 from the spindle socket during tool changing. Its motor is also used in orienting the spindle 274 to the predetermined angular position required for meshing the positive drive teeth 42 of the toolholder 35 with the drive teeth of the spindle socket.

SYNOPSIS OF OPERATION—VERTICAL MACHINE

In the following summary of the operation of the machine 260 with the automatic tool changer 261, it will be assumed that the machine has just completed a machining cycle with the old tool (actually a toolholder) in the spindle 274 and that the control has called for a tool change. The sequence is then as set forth below:

(1) The headstock 272 shifts from the machining position indicated in FIGS. 17 and 18 upwardly to the tool change position indicated in FIGS. 22 and 23 so as to bring the exchange arm 50 into closer proximity with the end of the shuttle track 99. The spindle ceases rotation and becomes oriented for tool change by engagement of the shot pin 235 and orientation shoulder 238 described above.

(2) Tool carriage 104 is moved downwardly by extending its actuator 115, extracting a new tool (actually a toolholder) and its tool cup from the matrix 278, turning it 90° by means of the carriage head 106, and presenting it in the position shown in FIGS. 22 and 23 with its axis parallel to that of the spindle. The tool exchange arm 50 is moved axially downward from its park position at the bottom of the headstock.

(3) The tool exchange arm 50 is then rotated counterclockwise (as viewed from the top) to tool pick-up position in which it engages the tool in the spindle and the tool in the tool cup held by the tool carriage. The draw bolt mechanism 202 releases the old tool in the spindle and the exchange arm 50 releases the tool cup latch 76 of the new tool in the carriage 104.

(4) The exchange arm 50 is moved axially downward, extracting the tool from the spindle and the tool from the tool cup held by the carriage 104.

(5) The exchange arm 50 is rotated 180°, exchanging the positions of the old and the new tools.

(6) The exchange arm then retracts axially, inserting the new tool in the spindle and the old tool in the empty tool cup on the tool carriage. The power draw bolt mechanism 202 engages the new tool in the spindle. The shot pin 235 is retracted from the orientation shoulder 238.

(7) The exchange arm 50 is rotated clockwise (as viewed from the top) through an acute angle and then raised to its park position. The tool carriage 104, with the old tool latched in its tool cup, is moved upwardly by retracting actuator 115. This swings the old tool and its tool cup through 90° and inserts the old tool and tool cup in the empty matrix pocket at the tool change station.

(8) With the new and the old tools secured in place, the headstock 272 moves downwardly from the tool change position and commences the next machining cycle.

I claim as my invention:

1. A multifunction machining center having a power driven spindle rotatable on an axis and an automatic tool changer, said machining center comprising, in combination:

(a) an upstanding column;

(b) a headstock mounted on said column for vertical sliding movement with respect thereto and including said power driven spindle; said headstock having a tool change position;

(c) a tool storage matrix having a drum journaled on an axis; said matrix being situated on one side of said column in outwardly spaced relation thereto and adapted to carry toolholders for movement in a curved path with their axes perpendicular to a vertical plane passing through said spindle axis;

(d) a tool transport shuttle mechanism nested between said matrix and said column and being secured relative to the latter;

(e) said shuttle mechanism including a track disposed radially of said curved toolholder path and having a tool carriage translatable on said track; said track lying in a plane passing through the axis of said tool storage matrix drum and being parallel to the axis of said tool spindle;

(f) said carriage including means to releasably support a toolholder and to transport same along said track to and from the matrix and to turn said toolholder through 90 degrees as an incident to such transport along said track;

(g) a two handed tool exchange arm mounted on said headstock for axial movement parallel to the spindle axis and rotational movement in planes perpendicular to said spindle axis; and (h) said exchange arm being adapted to simultaneously withdraw toolholders from the spindle and from the tool carriage, to exchange their positions by rotation through 180 degrees, and to simultaneously move them axially so as to insert them in the tool carriage and in said spindle respectively.

2. A machining center as defined in claim 1, wherein said matrix is rotatably supported on an extension housing fixed to the side of said column, and said tool transport shuttle mechanism is nested within a tunnel in said extension housing.

3. A machining center as defined in claim 1, wherein the combination further comprises:

(i) a plurality of individual tool cups releasably supported in said tool storage matrix and adapted to carry toolholders with their axes perpendicular to the plane of the spindle axis;

(j) said carriage being adapted to releasably support a tool cup including a toolholder and to transport same along said track to and from the matrix and to turn them through 90 degrees as an incident to such transport along said track; and (k) said exchange arm being adapted to simultaneously withdraw toolholders from the spindle and from the tool cup supported by said tool carriage, to exchange their positions by rotation through 180 degrees, and to simultaneously move them axially so as to insert them in the tool cup on said tool carriage and in said spindle respectively.

4. A machining center as defined in claim 3, wherein the transport shuttle mechanism comprises a track fixed to the side of the column and extending around to the front thereof, and a tool carriage translatable along said track having a pivotal head adapted to carry a tool cup and toolholder.

5. A machining center as defined in claim 1, wherein the combination further comprises:

(i) a plurality of individual tool cups releasably supported in said tool storage matrix and said tool carriage, each said tool cup being adapted to carry a toolholder;
(j) a releasable latch on each said tool cup having means for positively securing the toolholder therein; and
(k) an abutment on said tool exchange arm disposed for engagement of said latch to release same as said arm swings into engagement with a toolholder in said tool carriage.

6. A machining center as defined in claim 5, wherein said tool exchange arm has a pocket adjacent each end for engaging a toolholder, and a projecting abutment adjacent each said pocket disposed for engagement with said tool cup latch to release same as an incident to engaging a toolholder in the tool carriage.

7. A machining center as defined in claim 1, wherein the combination further comprises:
(i) a plurality of individual tool cups releasably supported in said tool storage matrix and said tool carriage, each said tool cup being adapted to carry a toolholder;
(j) means defining a plurality of individual pockets for receiving said tool cups;
(k) a mechanical latch mounted on said matrix adjacent each said pocket for retaining a toolholder therein;
(l) said mechanical latch being disposed for interception by said tool carriage and thus releasable as an incident to extraction of the tool cup by said tool carriage.

8. A machining center as defined in claim 1, wherein the combination further comprises:
(i) a plurality of individual tool cups releasably supported in said tool storage matrix and said tool carriage, each said tool cup being adapted to carry a toolholder;
(j) a mechanical latch on said tool carriage for retaining a tool cup therein; and
(k) means including a lost motion drive connection with said tool carriage constructed and arranged to release said latch as an incident to returning a tool cup to the matrix.

9. A machining center as defined in claim 1, wherein the combination further comprises:
(i) a plurality of individual tool cups releasably supported in said tool storage matrix and said tool carriage, each said tool cup being adapted to carry a toolholder;
(j) means defining an arcuate pocket adjacent each end of said tool exchange arm for engaging a toolholder;
(k) a pair of mechanical latches pivotally mounted adjacent each said pocket respectively for retaining the toolholders therein; and
(l) a depending lug fixed to each said mechanical latch and projecting toward said headstock in position to release said latches as an incident to inserting the toolholders in the spindle and the tool carriage.

10. The combination set forth in claim 1, wherein said tool storage matrix further comprises:
(i) a pair of drums disposed in spaced apart coplanar relation with each other and in axially spaced relation with said column;
(j) an endless metallic band trained around said drums and defining straight reaches therebetween; and
(k) a plurality of tool receptacles fixed in longitudinally spaced relation along said endless band.

11. The combination set forth in claim 10 wherein one said drum is adjustably movable relative to the other to control the tension of said endless band, and the other drum is power driven in timed relation to said shuttle.

12. The combination set forth in claim 10, wherein said matrix further comprises:
(l) means defining a tool change station at one said drum;
(m) support bars disposed in straddling relation with the straight reaches of said endless band;
(n) means on said tool receptacles for slidably engaging said support bars; and
(o) the ends of said support bars adjacent said tool change station having arcuate extensions engageable by each said receptacle at the tool change station.

13. A machining center as defined in claim 1, wherein said power driven spindle is vertical.

14. A multifunction machining center having a power driven spindle and an automatic tool changer, said machining center comprising the combination of:
(a) an upstanding column;
(b) a headstock mounted for vertical sliding movement on said column;
(c) a power driven spindle in said headstock;
(d) a two handed tool exchange arm mounted on said headstock for axial movement parallel to the axis of said spindle and for indexing movement perpendicular to said spindle axis;
(e) a tool storage matrix journaled on one side of said column and having a plurality of pockets releasably supporting a plurality of tool cups for movement in a curved path;
(f) latching means on said matrix for releasably retaining said tool cups;
(g) a shuttle track mounted between said matrix and said column, said track being fixed relative to said column and disposed radially of said curved path of said tool cups;
(h) a tool carriage mounted for translational movement along said track and having a fork for releasably supporting a tool cup;
(i) latching means on said tool carriage for releasably retaining the tool cup;
(j) actuator means interposed between said tool carriage and an anchorage fixed relative to said column;
(k) connecting means between said actuator means and said tool carriage for introducing a predetermined lost motion in both the forward and rearward directions; and
(l) means on said tool carriage for releasing said matrix latching means in response to said lost motion in a forward direction, and for releasing said shuttle latching means in response to said lost motion in a rearward direction.

15. A machining center as defined in claim 14, wherein said power driven spindle is vertical.

16. The combination set forth in claim 14, wherein said tool storage matrix further comprises:
(i) a pair of drums disposed in spaced apart coplanar relation with each other and in axially spaced relation with said column;
(j) an endless metallic band trained around said drums for movement in unison therewith and defining straight reaches therebetween;
(k) a plurality of tool receptacles fixed in longitudinally spaced relation along said endless band;

(l) support bars disposed in straddling relation with the straight reaches of said endless band; and (m) means on said tool receptacles for slidably engaging said support bars.

17. The combination set forth in claim 16, wherein said endless metallic band is formed with a plurality of longitudinally spaced apertures and said drums are formed with radial lugs spaced for engagement with said apertures.

18. A multifunction machining center having a horizontal spindle rotatable on an axis and an automatic tool changer, said machining center comprising, in combination:

(a) an upstanding column mounted on a compound slide for movement on two coordinate axes;

(b) a headstock mounted on said column for vertical sliding movement with respect thereto and including said horizontal spindle; said headstock having a tool change position;

(c) a tool storage matrix journaled on an axis and situated on one side of said column in outwardly spaced relation thereto; said matrix being adapted to carry toolholders for movement in a curved path with their axes perpendicular to a vertical plane passing through said spindle axis;

(d) a tool transport shuttle mechanism nested between said matrix and said column and being secured to the latter;

(e) said shuttle mechanism including a track disposed radially of said curved toolholder path and a tool carriage translatable on said track; said track lying in a plane defined by the axes of said tool spindle and said tool storage matrix when said headstock is in tool change position;

(f) said carriage including means to releasably support a toolholder and to transport same along said track to and from the matrix and to turn said toolholder through 90 degrees as an incident to such transport along said track;

(g) a two handed tool exchange arm mounted on said headstock for axial movement parallel to the spindle axis and rotational movement in planes perpendicular to said spindle axis; and (h) said exchange arm being adapted to simultaneously withdraw toolholders from the spindle and from the tool carriage, to exchange their positions by rotation through 180 degrees, and to simultaneously move them axially so as to insert them in the tool carriage and in said spindle respectively.

19. A multifunction machining center having a horizontal spindle and an automatic tool changer, said machining center comprising the combination of:

(a) an upstanding column;

(b) a headstock mounted for vertical sliding movement on said column;

(c) a horizontal spindle in said headstock;

(d) a two handed tool exchange arm mounted on said headstock for axial movement parallel to the axis of said spindle and for indexing movement perpendicular to said spindle axis;

(e) a tool storage matrix journaled on said column and having a plurality of pockets releasably supporting a plurality of tool cups for movement in a curved path;

(f) latching means on said matrix for releasably retaining said tool cups;

(g) a shuttle track mounted between said matrix and said column, said track being fixed to said column and disposed radially of said curved path of said tool cups;

(h) a tool carriage mounted for translational movement along said track and having a fork for releasably supporting a tool cup;

(i) latching means on said tool carriage for releasably retaining the tool cup;

(j) actuator means interposed between said tool carriage and an anchorage fixed to said column;

(k) connecting means between said actuator means and said tool carriage for introducing a predetermined lost motion in both the forward and rearward directions; and (l) means on said tool carriage for releasing said matrix latching means in response to said lost motion in a forward direction, and for releasing said shuttle latching means in response to said lost motion in a rearward direction.

* * * * *